United States Patent [19]

Thatcher et al.

[11] Patent Number: 4,860,038
[45] Date of Patent: Aug. 22, 1989

[54] UNDERWATER BUBBLE CAMERA

[75] Inventors: Herbert vH. Thatcher, Encinitas; Richard C. Mursinna, San Diego; Richard E. Tackabery, Carlsbad, all of Calif.

[73] Assignee: Honeywell Inc., Minneapolis, Minn.

[21] Appl. No.: 188,716

[22] Filed: Apr. 29, 1988

Related U.S. Application Data

[63] Continuation of Ser. No. 913,053, Sep. 29, 1986, abandoned.

[51] Int. Cl.⁴ .................. G03B 17/56; H04N 5/26
[52] U.S. Cl. ................................ 354/64; 358/109
[58] Field of Search .................... 354/63–65, 354/81, 288, 293, 173.1; 358/99, 108

[56] References Cited

U.S. PATENT DOCUMENTS

| 685,463 | 10/1901 | Walkins | 354/64 |
|---|---|---|---|
| 1,156,782 | 10/1915 | Jenkins | 354/64 X |
| 2,996,967 | 8/1961 | Edgerton | 354/64 |
| 3,121,377 | 2/1964 | Barbera | 354/65 |
| 3,484,317 | 12/1969 | Dickerson | 354/64 X |
| 3,596,082 | 7/1971 | Doret | 354/64 X |
| 3,638,502 | 2/1972 | Leavitt et al. | 358/109 |
| 3,711,638 | 1/1973 | Davies | 358/108 |
| 3,720,147 | 3/1973 | Bemis | 354/81 |
| 3,798,368 | 3/1974 | Kardach et al. | 358/108 X |
| 4,031,544 | 6/1977 | Lapetina . | |
| 4,051,523 | 9/1977 | Laikin et al. . | |
| 4,080,629 | 3/1978 | Hammond et al. | 358/108 X |
| 4,184,758 | 1/1980 | Winnacker . | |
| 4,229,762 | 10/1980 | Healey . | |
| 4,236,794 | 12/1980 | Gordon | 354/81 X |
| 4,281,343 | 7/1981 | Monteiro . | |
| 4,295,721 | 10/1981 | Rebikoff . | |
| 4,312,580 | 1/1982 | Schwomma et al. . | |
| 4,320,949 | 3/1982 | Pagano | 354/81 |
| 4,346,404 | 8/1982 | Gantenbrink . | |
| 4,381,144 | 4/1983 | Breslau . | |
| 4,485,398 | 11/1984 | Chapin et al. . | |
| 4,502,407 | 3/1985 | Stevens . | |

FOREIGN PATENT DOCUMENTS 1162870  2/1964  Fed. Rep. of Germany ........ 358/99

Primary Examiner—Donald A. Griffin
Attorney, Agent, or Firm—W. T. Udseth

[57] ABSTRACT

A camera, means for varying the direction of the field of view of the camera and means for focusing the camera are all secured within a water-tight enclosure. The enclosure has a transparent viewing port and is spherical or near spherical. No moving parts extend beyond the enclosure and a single cable housing contains all wires and control lines leading to the enclosure.

11 Claims, 4 Drawing Sheets

UNDERWATER BUBBLE CAMERA

This application is a continuation of application Ser. No. 913,053 filed Sept. 29, 1986 and now abandoned.

BACKGROUND OF THE INVENTION

1. Field of the Invention

The invention relates to underwater camera assemblies having the camera, and pan and tilt apparatus all within a single watertight enclosure.

2. Related Art

Cameras for use underwater are typically included in expensive systems, which are large and heavy. The camera is connected to wet pan or tilt servo-mechanisms. These servo-mechanisms require special treatment to make them watertight. Often portions of the servo-mechanisms remain exposed subjecting such portions to corrosion, particularly in saltwater environments. A plurality of cables (which carry the electrical or other control signals) extend from the assembly rendering the mechanism suscept to fouling and entanglement. The cables also often obscure the camera's field of view.

An underwater black and white, or color camera assembly which would alleviate the above problems while providing pan, tilt and focus capabilities, is highly desirable and, heretofore, undisclosed.

SUMMARY OF THE INVENTION

The present invention is an underwater camera assembly including: a transparent solid member which is impermeable to water; a support member which is impermeable to water and configured to form a spherical or substantially spherical enclosure with the transparent solid member; means for connecting the transparent solid member and support member to form the enclosure; means for sealing the enclosure against water; a camera with a lens; a means for rotating the camera about a first axis in response to a first electrical rotation signal; means for rotating the camera about a second axis in response to a second electrical rotation signal, wherein the first and second axes are orthogonal; means for adjusting the focal distance of the lens in response to an electrical focus signal; and wherein the camera, the two field of view rotation means, and the focus adjust means are all secured within the enclosure.

Preferably the transparent solid member is a tough, acrylic shaped as a hemisphere, and the camera can rotate at least 120° about each of the two axes. The camera assembly may also include a means for automatically sensing and adjusting the camera iris, and a means for positioning the camera axis at the hemispherical radius center of the transparent member to prevent distortion of the transmitted image. All wires coming to the enclosure are preferably contained within a single, integral cable assembly and the cable assembly mates to a connector in the support member.

Further, a slight positive buoyancy is preferably provided by the camera assembly to facilitate its use as a component in an underwater mobile, mechanical system. Such positive buoyancy is not generally available in standard camera pan and tilt units.

The underwater camera disclosed herein is preferably referred to as the "bubble camera".

DESCRIPTION OF THE PREFERRED EMBODIMENT

Figure 1:
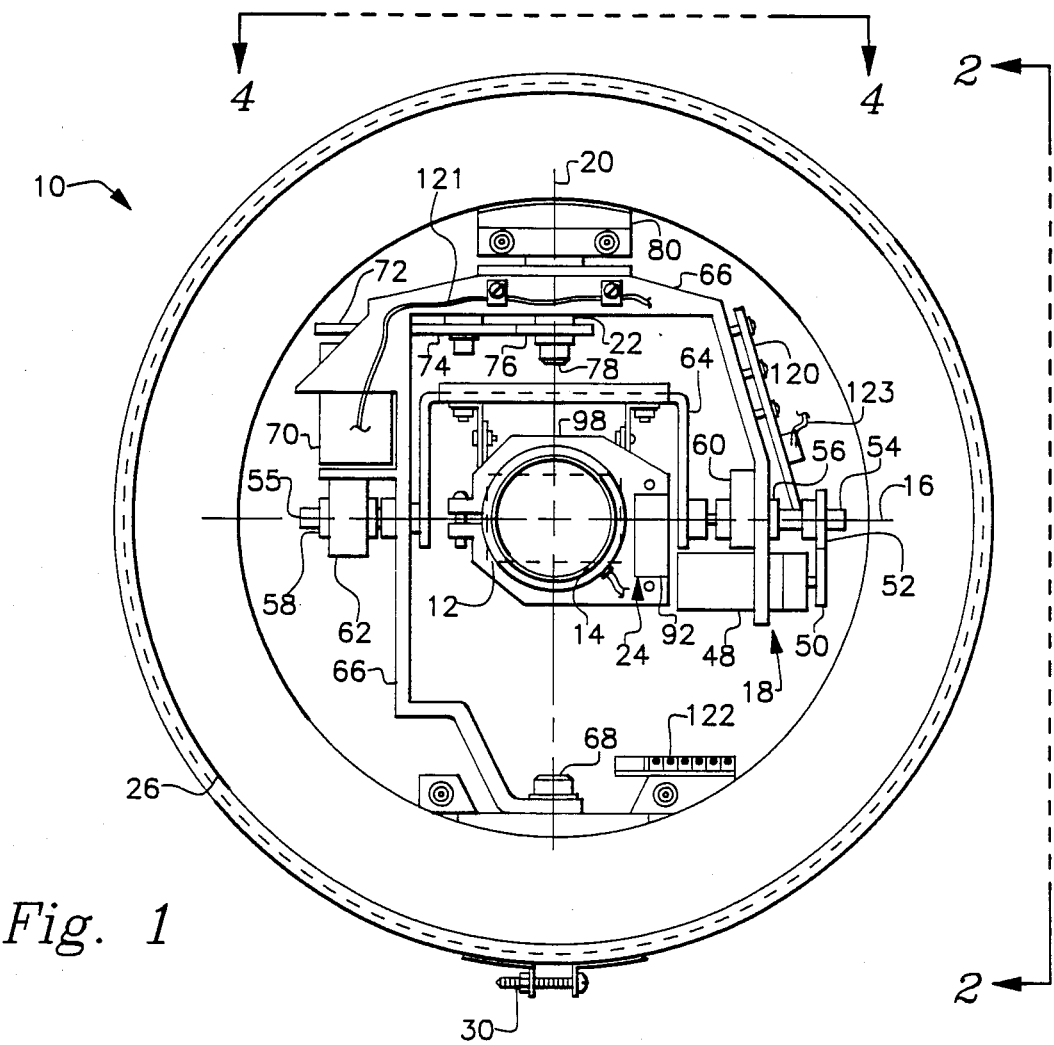
FIG. 1 is a front view of the underwater camera assembly.
Figure 2:
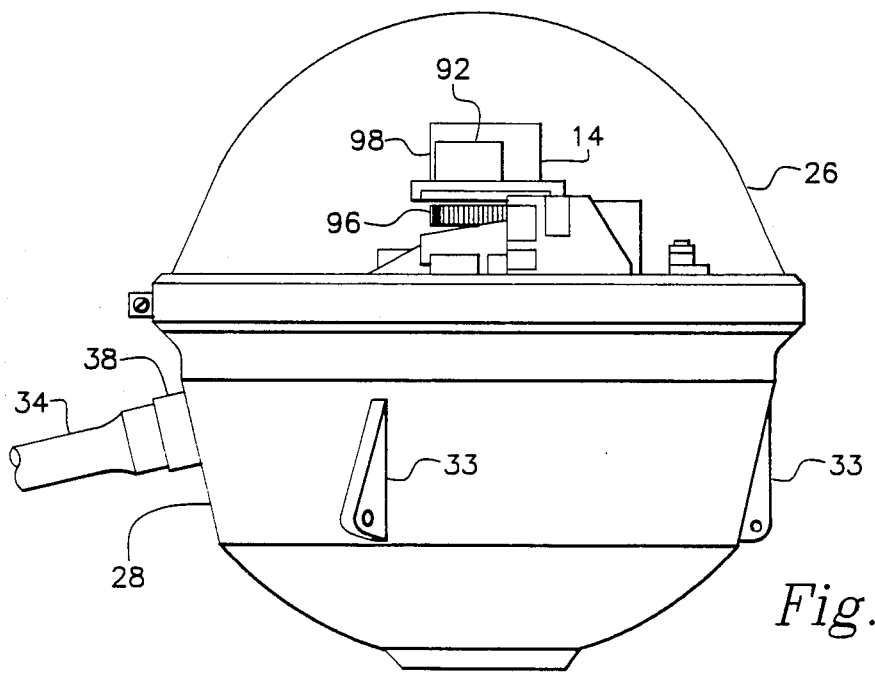
FIG. 2 is a side view of the underwater camera assembly along the direction of arrow 2 in FIG. 1.

Underwater camera assembly 10 (see FIGS. 1 and 2) includes: a camera 12, having a lens 14, means for rotating camera 12 about a first axis 16 (e.g. tilt drive servo-mechanism 18), means for rotating camera 12 about a second axis 20 which is orthogonal to first axis 16 (e.g. pan drive servo-mechanism 22), means for adjusting 24 the focal distance (and face plate illumination) of lens 14, a transparent solid member or structure 26 impermeable to water, a support member or structure 28 impermeable to water and configured to form a spherical or substantially spherical hollow enclosure when placed adjacent transparent solid member 26, means for securing 30 transparent solid member 26 and support member 28 together to form the hollow enclosure, means for sealing 32 the enclosure against water; and the means for rotating the field of view of camera 12 about first axis 16, the means for rotating the field of view of camera 12 about second axis 20, and the means for adjusting 24 the focal distance of lens 14, are all secured within the enclosure.

Positive buoyancy is afforded assembly 10 by selecting a sufficient volume within the enclosure to at least neutralize the weight of assembly 10 in water. Further positive buoyancy can be provided by making the enclosure larger or by adding flotation packing material (not shown) packed adjacent the outer walls of support member 28.

Conveniently, support member 28 includes a means for mounting (such as three equally spaced lugs or brackets 33) the hollow enclosure or housing.

An electronic cable assembly 34 connects to connector 38 which is secured to support member 28 through an aperture 36 in the bottom of support member 28. Within cable assembly 34 are wires (e.g. wires 40, 42, 44 and 46) for transmitting electrical control signals and power to or from camera assembly 10. These wires pass through connector 38 into the enclosure.

The various components described above will now be more particularly described. Unless specifically indicated otherwise, these detailed descriptions of the subassemblies of assembly 10 are given merely by way of example as a useful and convenient embodiment of the present invention, and not by way of limitation.

Camera 12 is a black and white charge coupled device (CCD) unit. It is available with CCIR or RS 170 signal format. An example of a suitable camera is a Pulnix No. TM-34K(RS170) or No. TM-36K (CCIR). Lens 14 is an auto-iris unit model No. C814BEX manufactured by Cosmicar. An optical color CCD camera (e.g. model No. EVC-03 by X$_y$bion) is also available.

The Cosmicar lens has an 8 mm focal length, a "C" mount, an f/1.4 aperture with a focus range of 6 inches to infinity. When enclosed by a hemispherical transparent solid member 26, the view angle (due to the air/water interface) is 63 degrees on the diagonal, 52 degrees horizontal and 40 degrees vertical.

Transparent solid member 26 is preferably a hemisphere made of acrylic (e.g. LP391 or stronger) and is coated with a scratch resistant material. Support member 28 is also nearly hemispherical, made of (for example) A-356 cast aluminum.

Tilt axis servo-mechanism 18 includes tilt axis servo motor 48, gear 50, gear 52, shafts 54 and 55, linear bearings 56 and 58, pillow blocks 60 and 62, and mounting bracket 64.

Pan axis servo-mechanism 22 includes mounting bracket 66, ball bearing pivot 68, pan axis servo-motor 70, gears 72, 74 and 76, ball bearing pivot 78, spacer 80, and bearings 82 and 84.

The means for securing 30 transparent member 26 and support member 28 is a band clamp assembly including band 86 and thermal contraction compensation and support rubber ring 88. O-ring 90 seals the interface of transparent member 26 and support member 28 (and is an example of sealing means 32).

The means for adjusting 24 the focal distance of lens 12 includes focus adjust motor 92, gears 94 and 96, and mounting bracket 98.

Weights (e.g. lead) 91 are used to counter balance lens weight 14 to reduce the torque/power requirement on servo motor 48.

Figure 7:
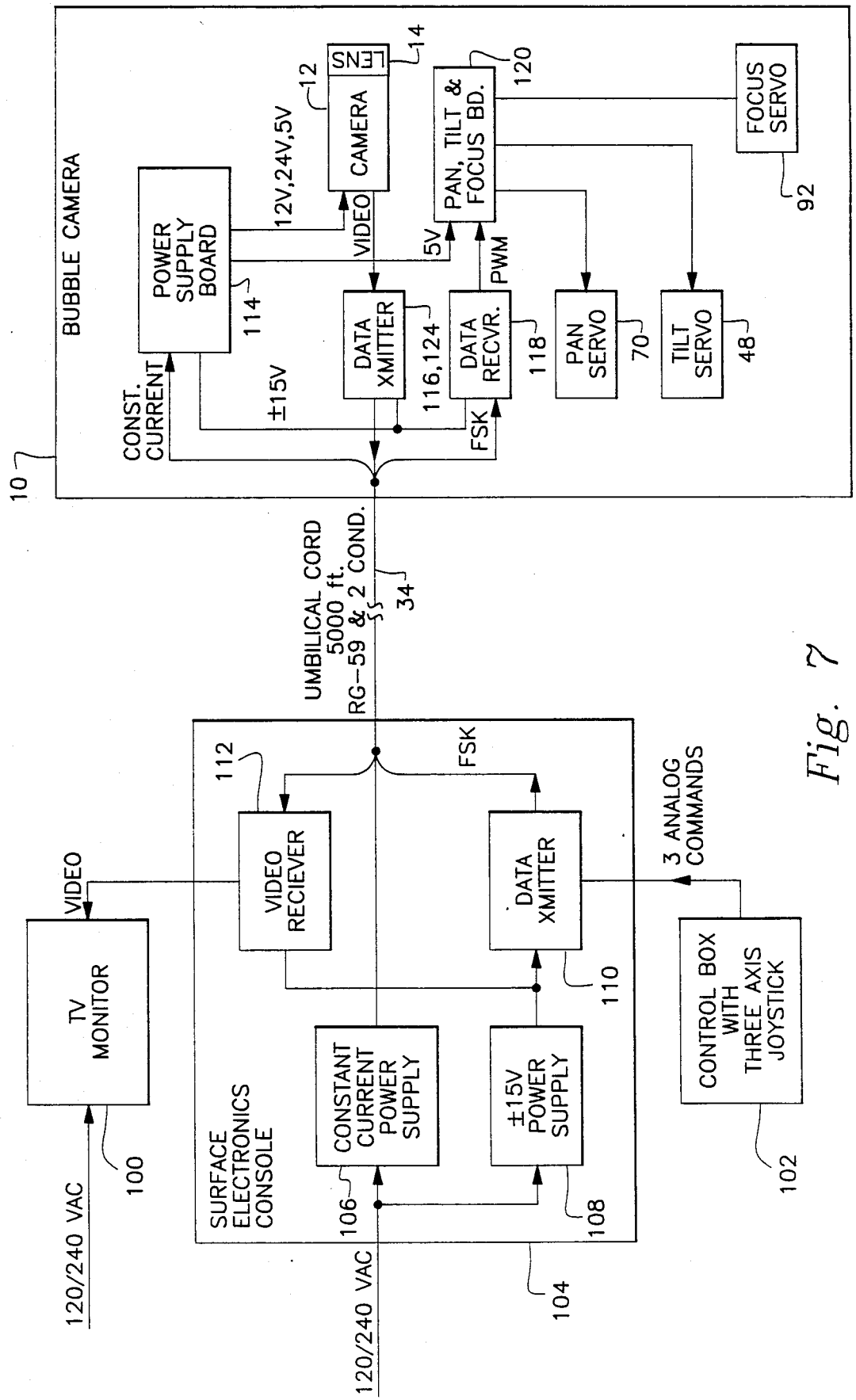
FIG. 7 is a block diagram of a system which advantageously sizes the underwater camera assembly.

FIG. 7 is a block diagram of a system which can advantageously employ assembly 10. This system includes a TV monitor 100, a control box 102, a surface control console 104 and bubble camera/underwater camera assembly 10.

TV monitor 100 can be any brand TV which accepts composite video signals.

Control box 102 is preferably a small, hand held enclosure that contains a three-axis joystick (not shown). The joystick derives its power from the power supply ($\pm 15$ v) in console 104 (see below). Typically, the joystick has three potentiometers which are used for the pan, tilt and focus signals, respectively.

Surface electronic console 104 is preferably an enclosure to be positioned above the water's surface as a stand-alone unit or as a 19 inch rack mount. Console 104 houses a constant current power supply 106, a $\pm 15$V D.C. power supply 108, a data transmitter 110 and a video receiver 112.

Data transmitter 110 accepts the analog commands for pan, tilt and focus from control box 102. It encodes these into a serial data stream, which is then converted to frequency shift keying (FSK) and coupled to a coax cable within cable housing 34 for transmission to bubble camera 10. FSK essentially transmits one frequency to represent a digital 1, and a second frequency to represent a digital 0. FSK is preferred as the method of transmitting dowlink commands because of the increased noise immunity it offers over serial digital data.

Video receiver 112 accepts the uplink video from bubble camera 10 on a RF (radio frequency) carrier and puts out the raw video to the TV monitor 100. The RE carrier is used to lessen the effects of long umbilical cable 34 on the video. Essentially, video information is represented as different frequency deviations from a center, or "carrier" frequency. Placing the video on a RF carrier eliminates the need for pre and post equalizers. Equalizers are needed to transmit baseband video over long cables due to the fact that the higher frequency components tend to be attenuated more than the lower frequency components by the coax. Attenuating the higher frequency components of video will distort the detailed video information. Frequency modulating a carrier with the video lessens this problem. Video amplitude variations are translated into frequency deviations. The amplitude of the signal is still attenuated differently at different frequencies, but now the information is transmitted as frequencies, not amplitude. Therefore, amplitude changes are ignored.

The uplink video, downlink commands and constant current power supply 106 all connect to umbilical cable 34. Cable 34 can be very long (e.g. 5000 feet). The bubble camera system employs one RG-59 coax, and two power conductors. Although the constant current power supply 106 makes the bubble camera system somewhat independent of cable length (for power), these two conductors should be as large as possible. Preferably, they should be AWG 20 or larger.

The system of FIG. 7 derives its power from electrical outlets at the installation where it is deployed. This power is preferably 120VAC or 240VAC, 50 Hz or 60 Hz.

Bubble camera assembly 10 further includes power supply board 114, video transmitter 116, data receiver 118, pan, tilt and focus board 120, and trim pot board 122.

Power supply board 114 accepts the constant current power supply from surface console 104 and converts it into 5V D.C., 12V D.C., $\pm 15$V D.C. and 24V D.C. Camera 12 (for example) uses 5V and 24V, lens 14 uses 12V, and pan, tilt and focus board 120 and servo 48, 70 and 92 use 5V. Video transmitter 116 and data receiver 118 uses $\pm 15$V.

Video transmitter 116 accepts baseband video from camera 12, and frequency modulates an RF carrier. This is then coupled on the coax in cable 34. An example of a suitable video transmitter is the transmitter unit in Hydro Product's RCV-225B underwater vehicle.

Data receiver 118 accepts downlink data information from the coax in cable 34, converts the FSK information into a pulse width modulated signal (PWM). This serial PWM is then sent to pan, tilt and focus board 120. An example of a suitable data receiver is the receiver unit in Hydro Product's RCV-225B underwater vehicle.

Figure 3:
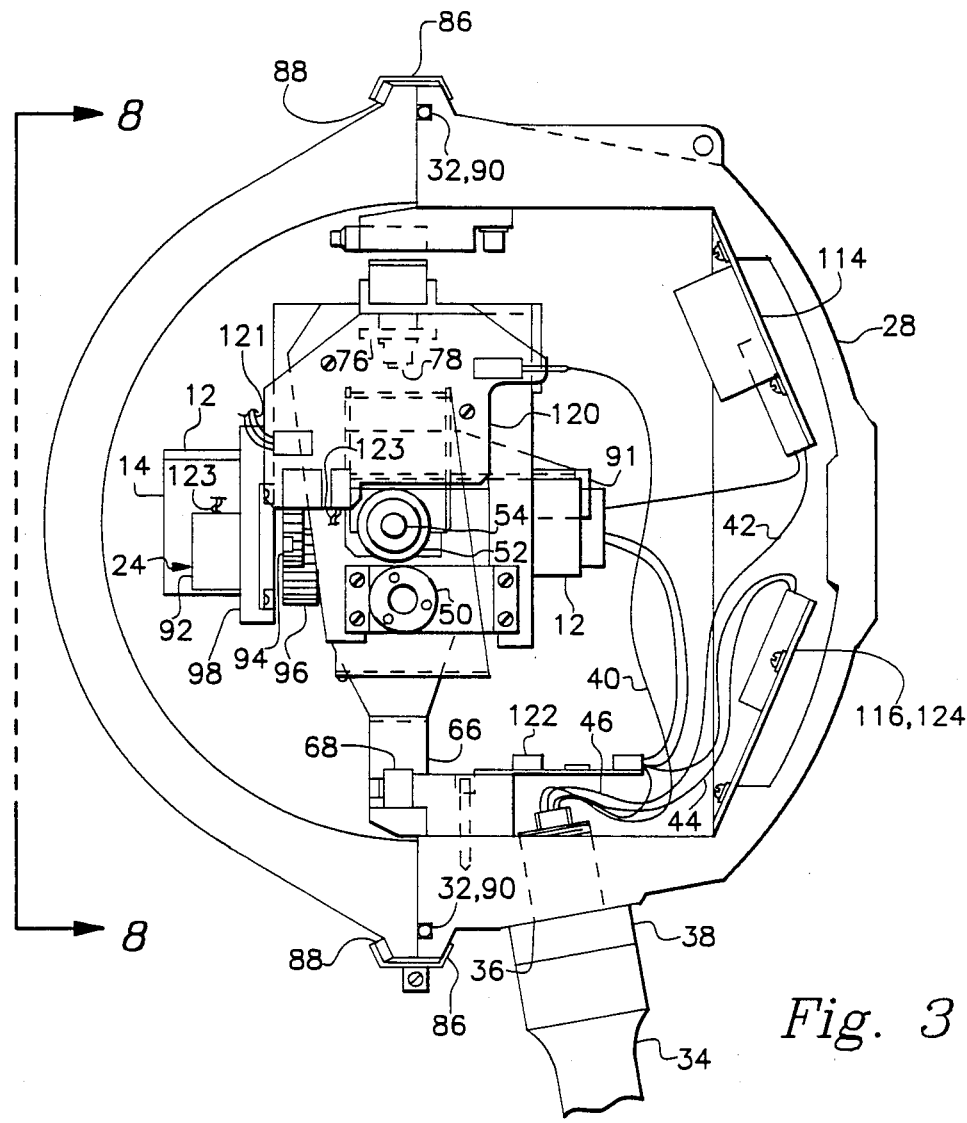
FIG. 3 is a sectional view of FIG. 1 along the direction of arrow 2 with the right half of the outer enclosure removed.
Figure 4:
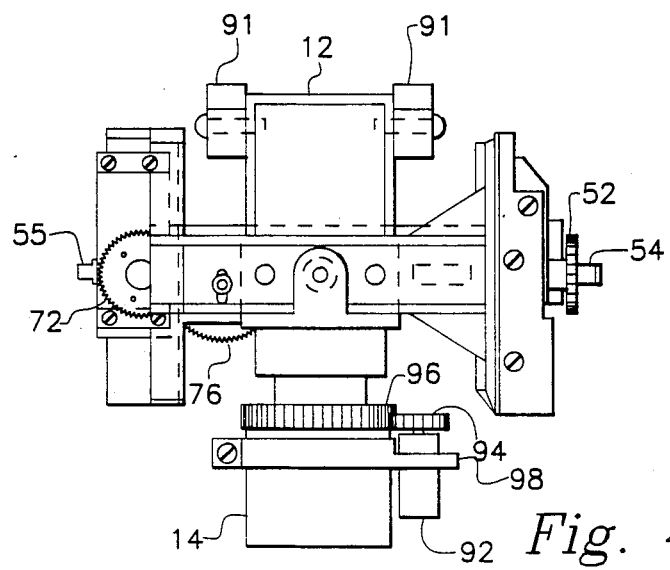
FIG. 4 is a view of FIG. 1 along the direction of arrow 4 with the enclosure removed.
Figure 5:
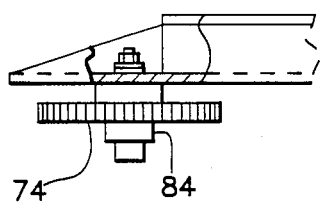
FIG. 5 is a enlarged partial view of part of the pan drive servo-mechanism.
Figure 6:
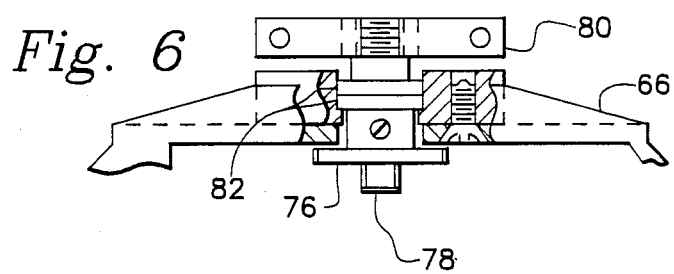
FIG. 6 is an enlarged partial view of another part of the pan drive servo-mechanism.
Figure 8:
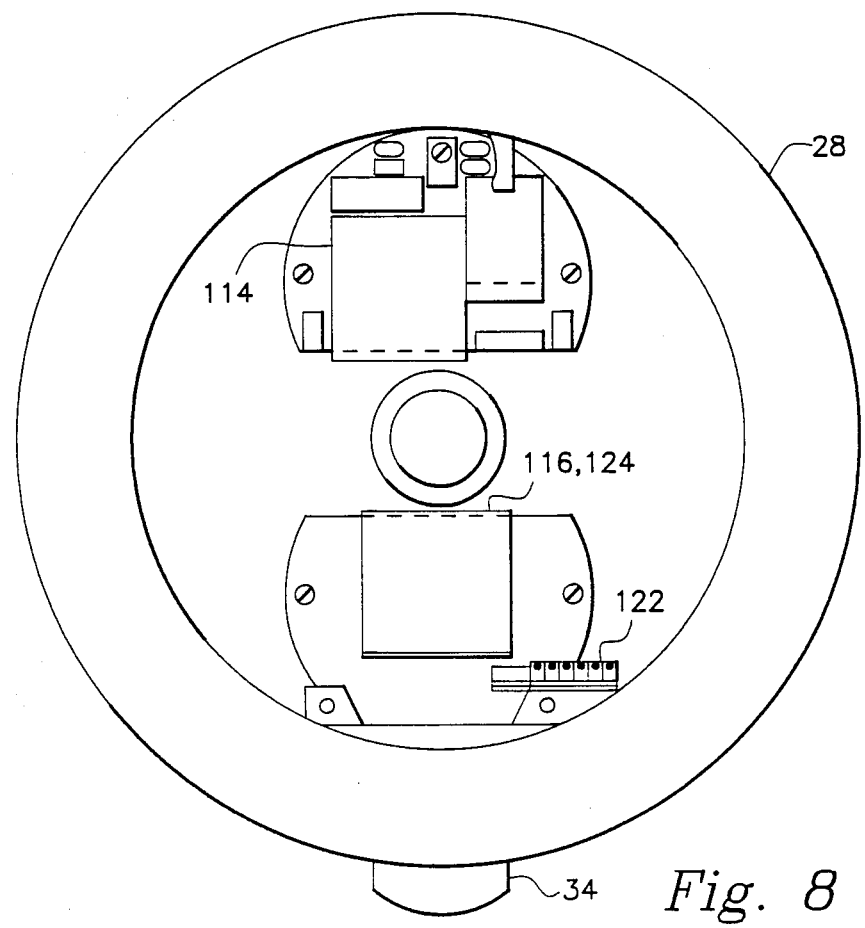
FIG. 8 is a view of FIG. 1 with the camera, and pan tilt and focus subassemblies removed.

Pan, tilt and focus board 120 accepts the serial PWM from data receiver 116, and outputs descrete PWM signals to pan 70, tilt 48 and focus 92 servos as appropriate. In FIG. 3, cable 121 connects board 120 and pan servo motor 70. Cable 123 connects focus servo motor 92 to board 120. By way of further example, the pulse width is 1.4 msec for "center", 0.9 msec for full travel to one side, and 1.9 msec for full travel to the other side.

Trim pot board 122 is comprised of a group of variable resistors which are individually adjusted to align the pan/tilt angle about a selected reference point and adjust the range of pan or tilt sweep. The pan/tilt assembly (i.e. mechanisms 18 and 22) can thus be centered without removal of the pan/tilt assembly from the enclosure.

Also, by way of further example, the composite video signal is RS-170, 1.0V pp composite, the video format is RS-170. Resolution is 280 lines horizontal and 350 vertical. Grey shades are 10 per EIA standard. Video signal bandwidth is 4.0 MHz.

The above example has described frequency modulation of a carrier. For some applications, one may wish to instead employ amplitude modulation of the video. In this case a pre-equalizer 124 located within the enclosure is preferred. The pre-equalizer will adjust the relative amplitudes of the higher and lower frequency components of the video to account for the greater attenuation suffered by the higher frequency components as they are transmitted along cable assembly 34. Pre-equalizer 124 is conveniently located in transmitter 116. A post equalizer (not shown) may also be included in the surface console.

The dynamic light range is $2.6 \times 10^6$ for the auto-iris lens. Light level sensitivity is 0.03 fc faceplate illumination. The Pulnix camera requires 18 watts of power (750 ma, 24V D.C.).

Mechanically, bubble camera assembly 10 is, in one useful configuration, 11.8 inches in diameter (including clamp assembly 86 but excluding bolt 30), weighs 18.6 lbs at sea level and 5 lbs (positive) in water. The depth rating can be varied by varying the strength of the materials for support member 28 and transparent member 26. With LP391 acrylic for member 26 and A356 cast aluminum for member 28, the one atmosphere bubble camera has a working depth rating of 5000 feet.

Bubble camera 10 as per the above specifications can operate over a temperature range of 0° to 40° C. and be stored over a temperature range of −30° to 40° C. It also has a pan view of ±90 degrees, and a tilt view Of ±65 to −85 degrees.

In further describing the operation of bubble camera assembly 10, assembly 10 is typically sealed at one atmosphere and submerged as a component attached to a larger submerged system (not shown). As described above, the pan, tilt and focus analog electrical control signals are input at control box 102 and transmitted along cable 34 to assembly 10.

By way of example (see FIG. 3), wire 40 carries video from camera 12 to the back of the enclosure (i.e. to support member 28) by way of transmitter 116. Wires 42 and 44 are DC voltage lines for supplying power to camera 14 and to the electronics boards. Wire 46 routes pan, tilt and focus signals to trim pot board 122 for scaling and conversion to pulse width modulated signals.

In response to the pan electrical control signal, pan servo-motor 70 is activated to drive and gear train 72, 74 and 76, and rotate bracket 66 about pivot points 68 and 78, and axis 20. In response to the tilt electrical control signal, tilt servo-motor 48 is activated to drive gears 50 and 52 and rotate bracket 64 about shafts 54 and 55, and axis 16. Similarly, the focus electrical control signal drives focus servo-motor 92, driving gears 94 and 96 to reciprocate lens 14 along a line perpendicular to the plane of axes 16 and 20.

Transparent member 26 is shaped as a section of a sphere or a near spherical enclosure. It is preferred that transparent member 24 is a hemisphere. Smooth contours on the surface of member 26 avoid sharp corners which add distortion to the field of view of camera 12. Smoothly contoured surfaces which are not sections of a sphere will tend to distort the field of view. Further, a spherical shape for the enclosure provides the strongest, lightest, smallest structure with the largest view port, in which to house the camera, pan and tilt mechanisms and electronics, and also provide an assembly with positive buoyancy. It is superior to extended cylinders or substantially aspherical housings. Transparent member 26 and support member 28 can each be comprised of several sub-parts, but it is preferable to make each unitary.

Many variations of the invention are possible. For example, purely mechanical instead of electro-mechanical means can be used to rotate and focus the camera.

Since no moving parts are located outside the enclosure formed by transparent member 26 and support member 28, no fouling will occur as camera 12 is maneuvered. By housing all conduits to and from the bubble camera 10 in a single cable 34, bubble camera 10 can be readily secured to other components with a minimum of accommodation for its data lines, etc.

What is claimed is:

1. An underwater camera assembly, comprising:
   a transparent solid member, impermeable to water;
   a support member, impermeable to water and configured to combine with said transparent solid member to form a spherical or substantially spherical enclosure, and wherein said transparent member spans a solid angle of at least 90° as measured from the approximate center of said spherical or substantially spherical enclosure;
   means for connecting said transparent solid member and said support member;
   means for sealing said enclosure against water;
   a camera having a lens;
   means for rotating said camera about a first axis in response to a first electrical rotate signal;
   means for rotating said camera about a second axis in response to a second electrical rotate signal;
   means for adjusting the focal distance of said lens in response to an electrical focus signal;
   means for providing a plurality of voltage level outputs in response to electrical energy supplied thereto, wherein selected of said voltage level outputs are applied to said camera, to said means for rotating said camera about a first axis, to said means for rotating said camera about a second axis and to said means for adjusting the focal distance; and
   wherein said camera, said means for rotating said camera about said first axis, said means for rotating said camera about said second axis, said means for adjusting the focal distance of said lens and said means for providing a plurality of voltage level outputs, are all secured within said enclosure.

2. The assembly of claim 1 wherein said transparent solid member and said support member are each unitary structures.

3. The assembly of claim 1 further including:
   mean for providing positive buoyancy to said assembly.

4. The assembly of claim 1 further including:
   electrical cable means for providing said first and second electrical rotate signals, and said electrical focus signal to said enclosure, wherein said electrical cable means passes through an aperture in said support member and said aperture, with said cable inserted, is sealed against water.

5. The assembly of claim 4 wherein said electrical cable means is a single, integral housing which encloses all wires connected to said assembly.

6. The assembly of claim 1 wherein said transparent solid member is shaped was a hemisphere.

7. The assembly of claim 1 wherein said camera can rotate at least 120° about said first axis, and said camera can rotate at least 120° about said second axis.

8. The assembly of claim 1 wherein said assembly has no moving parts which extend outside of said enclosure.

9. The assembly of claim 1 wherein said first and second axes are mutually orthogonal.

10. An underwater viewing system comprising:
a transparent structure, impermeable to water;
a support structure, impermeable to water and configured to combine with said transparent structure to form a spherical or substantially spherical enclosure, wherein said transparent structure spans a solid angle of at least 90° as measured form the approximate center of said spherical or substantially spherical enclosure;
means for connecting said transparent structure and said support structure;
means for sealing said enclosure against water;
means for viewing an image, wherein said viewing means has a field of view and can be focused;
means for varying the direction of said field of view in response to a first control signal;
means for focusing said viewing means in response to a second control signal;
means for providing a plurality of voltage level outputs in response to electrical energy supplied thereto, wherein selected of said voltage level outputs are applied to said means for viewing an image, to said means for varying the direction, and to said means for focusing; and
wherein said viewing means, said means for varying the direction of said field of view, said means for focusing said viewing means and said means for providing a plurality of voltage level outputs are all secured within said enclosure.

11. An underwater viewing system, comprising:
a transparent structure, impermeable to water;
a support structure, impermeable to water and configured to combine with said transparent structure to form a spherical or substantially spherical enclosure;
means for connecting said transparent structure and said support structure;
means for sealing said enclosure against water;
means for viewing an image, wherein said viewing means has a field of view and can be focused;
means for varying the direction of said field of view in response to a first control signal;
means for focusing said viewing means in response to a second control signal;
wherein said viewing means, said means for varying the direction of said field of view and, said means for focusing said viewing means are all secured within said enclosure and wherein said means for viewing is positioned at the approximate hemispherical radius center of said support structure so that said image is reproduced without significant distortion.

* * * * *

UNITED STATES PATENT AND TRADEMARK OFFICE
CERTIFICATE OF CORRECTION

PATENT NO. : 4,860,038

DATED : August 22, 1989

INVENTOR(S) : THATCHER ET AL

It is certified that error appears in the above-identified patent and that said Letters Patent is hereby corrected as shown below:

Column 7, line 2, cancel "was" and substitute --as--.

Signed and Sealed this

Seventeenth Day of July, 1990

Attest:

*Attesting Officer*

HARRY F. MANBECK, JR.

*Commissioner of Patents and Trademarks*